(12) United States Patent
Rose

(10) Patent No.: US 6,801,152 B1
(45) Date of Patent: Oct. 5, 2004

(54) METHOD FOR DETERMINING THE OPTIMUM OBSERVER HEADING CHANGE IN BEARINGS-ONLY PASSIVE EMITTER TRACKING

(75) Inventor: Conrad Rose, King George, VA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/419,163

(22) Filed: Apr. 21, 2003

(51) Int. Cl.[7] .............................................. G01S 13/72
(52) U.S. Cl. ............................ 342/13; 342/96; 342/97; 342/108; 342/113; 342/133; 342/139; 342/146; 342/147; 342/417; 342/450; 342/451; 342/465
(58) Field of Search ........................ 342/13, 90, 93–97, 342/107, 108, 113, 115, 133, 135, 139, 140, 145–147, 417, 442–444, 450, 451, 453, 463, 465

(56) References Cited

U.S. PATENT DOCUMENTS

| | | | | |
|---|---|---|---|---|
| 4,400,700 A | * | 8/1983 | Rittenbach | 342/100 |
| 4,737,788 A | * | 4/1988 | Kennedy | 342/29 |
| 5,376,940 A | * | 12/1994 | Abatzoglou | 342/192 |
| 5,610,609 A | * | 3/1997 | Rose | 342/13 |
| 5,689,274 A | * | 11/1997 | Rose | 342/417 |
| 5,774,087 A | * | 6/1998 | Rose | 342/13 |
| 5,870,056 A | * | 2/1999 | Fowler | 342/424 |
| 5,877,998 A | * | 3/1999 | Aidala et al. | 367/124 |
| 6,580,387 B2 | * | 6/2003 | Kronhamn | 342/146 |
| 6,714,155 B1 | * | 3/2004 | Rose | 342/107 |
| 2002/0005803 A1 | * | 1/2002 | Baugh et al. | 342/453 |
| 2002/0196188 A1 | * | 12/2002 | Holt | 342/453 |
| 2004/0027257 A1 | * | 2/2004 | Yannone et al. | 340/945 |

OTHER PUBLICATIONS

"Passive tracking scheme for a single stationary observer", Chan, Y.T.; Rea, T.A.; Aerospace and Electronic Systems, IEEE Transactions on vol. 38, Issue: 3, Jul. 2002 pp.: 1046–1054.*

"Multi–platform bearings–only tracking fusion of maritime targets", Xu Jing; Wang Xiukun; Hu Jiasheng; Zhao Jing; Radar, 2001 CIE International Conference on, Proceedings, Oct. 15–18, 2001 pp.: 1112–1114.*

"A linear least squares algorithm for bearings–only target motion analysis", Streit, R.L.; Walsh, M.J.; Aerospace Conference, 1999. Proceedings. 1999 IEEE, vol.: 4, Mar. 6–13, 1999 pp. : 443–455 vol. 4.*

"Discrete–time observability and estimability analysis for bearings–only target motion analysis", Le Cadre, J.E.; Jauffret, C.; Aerospace and Electronic Systems, IEEE Transactions on, vol.: 33, Issue: 1, Jan. 1997 pp.: 178–201.*

* cited by examiner

Primary Examiner—John B. Sotomayor
(74) Attorney, Agent, or Firm—Lowe Hauptman Gilman & Berner, LLP

(57) ABSTRACT

Emitter target range and heading are estimated from bearing measurements enhancing bearings-only estimator convergence to a target track, and permitting optimization of an observer position relative to the target at the end of the total bearing measurement period. One or more estimates of the target range, speed and heading made from bearing measurements before an observer maneuver are used to determine the most appropriate observer maneuver giving complete bearings-only target-motion-analysis observability. A set of parameters characterizing a set of potential emitter signal sources is generated based on measured emitter characteristics. A most probable set of emitter platforms is identified and the emitter operating mode and corresponding platform set are associated with a kinematic regime set. A specific speed or discrete set of speeds best adapted to a set of all possible platform missions, emitter speed as a continuous function of emitter range, and emitter range are all determined.

18 Claims, 6 Drawing Sheets

METHOD FOR DETERMINING THE OPTIMUM OBSERVER HEADING CHANGE IN BEARINGS-ONLY PASSIVE EMITTER TRACKING

RELATED APPLICATION

The present application is related to co-pending patent application entitled "A METHOD OF PASSIVELY ESTIMATING AN EMITTER'S POSITION AND VELOCITY USING BEARINGS-ONLY WITHOUT REQUIRING OBSERVER ACCELERATION" Ser. No. 10/419 193 and assigned to the instant assignee and filed on even date herewith and is hereby incorporated by reference into the present specification in its entirety.

FIELD OF THE INVENTION

The present invention relates generally to radars, and more particularly, to bearings-only passive emitter tracking. Even more particularly, the present invention is related to a method of and apparatus for determining the optimum observer heading change in bearings-only passive emitter tracking.

A moving observer, e.g. an aircraft, able to measure bearings to an emitter, generates the range, speed and heading of the emitter based on the measured bearings. This bearings-only passive emitter tracking is called target motion analysis (TMA). Passive TMA is useful because emitters can be detected and tracked at much longer ranges than possible using active radar.

However, passive emitter tracking or ranging is intrinsically less accurate than active radar tracking and requires many bearing measurements, and hence, additional time to converge to a solution. Also bearings-only TMA requires the observer to maneuver at some point during the bearing measurement period. The fact that the observer does not know the emitter's location or velocity until after the observer has maneuvered introduces a large element of risk when aircraft use TMA for target tracking.

To combine bearing measurements with the requisite maneuver, the observer typically flies a doglegged course. Constant velocity tracks with frequent heading changes allow the estimator, i.e. the observer, to uniquely determine range and velocity based on the bearing measurements if the emitter is flying a constant velocity track. When a unique solution exists, the target location, speed and heading is said to be "observable." The general concept of estimator observability is presented in Anderson and Moore, *Optimal Filtering*, Prentice-Hall, New Jersey 1979. Fogel and Gavish, in "$N^{th}$-Order Dynamics Target Observability from Angle Measurements", *IEEE Transactions on Aerospace and Electronic Systems*, AES-24, 3 (May 1988), describe the observability problem specifically for bearings-only passive emitter tracking. In particular, they demonstrate that heading change is sufficient to provide convergence to a unique solution when tracking a constant velocity target.

Prior methods of bearings-only target tracking, such as the method described by U.S. Pat. No. 5,877,998 (the '998 patent) to Aidala, et at. in "Recursive Method for Target Motion Analysis" emphasize such observer motion. The '998 patent refers to observer tracks as data collection legs. In the '998 patent, bearing measurements from the first and second leg, are filtered to produce a smoothed bearing estimate, a bearing-velocity estimate, and a bearing-acceleration estimate. These estimates are used to generate target range and velocity. Further, the '998 patent finds it desirable to incorporate at least a third, and possibly more, measurement legs to reduce estimation error.

The method disclosed in the '998 patent and other current techniques for doing bearings-only TMA, fail to exploit the results presented by B. J. McCabe in "Accuracy and Tactical Implications of Bearings-Only Ranging Algorithms", *Operations Research*, Vol. 33, No. 1, 1985. McCabe showed that there is a preferred method in performing data collection over the first two legs. McCabe defines the tracking observer, or tracker, as leading the emitter if the velocity vectors 100, 101 (FIG. 1*a*) are on the same side of the line-of-sight (LOS) vector 105 when the first data collection leg begins. The tracker lags if tracker velocity vector 102 (FIG. 1*b*) and the target velocity vector 103 are on opposite sides of the LOS vector 106.

Hence, a two leg maneuver, as required by Aidala, may be either a lead followed by a lag, or vice-versa. A lead-lag observer maneuver occurs when both emitter and observer velocity vectors are initially on the same side of the line-of-sight, then after performing a maneuver the vectors are on opposite sides. A lag-lead observer maneuver occurs when the observer velocity vector is initially on the opposite side of the line-of-sight to the emitter's velocity vector, then the velocity vectors are on the same side after performing a maneuver. The two leg maneuver could also be a lead-lead or a lag-lag maneuver. McCabe describes that among all possible two leg maneuvers the lead-lag (FIG. 1*a*) is much preferred in conventional TMA. For instance, the estimated range error at the end of the lead-lag maneuver can, theoretically, be only 20% of the lag-lead (FIG. 1*b*) error. Thus, if the lead-lag maneuver is performed, a third leg 104 (FIG. 1*b*) to reduce estimation error would not be required in a significant number of cases. Furthermore, by a straightforward extension of McCabe's work it can be shown that both lead-lag and lag-lead maneuvers are generally superior to the other dogleg maneuver combinations.

As McCabe noted, conventional TMA implementations, such as that described by Aidala, are unable to take advantage of the above facts. At the start of TMA, the tracker does not know whether it is leading or lagging the emitter because the emitter's velocity vector is not known. Because of the observability constraint discussed by Fogel and Gavish, the velocity vector is not obtained until the second leg.

This has potentially dire tactical consequences when the observer is a high-speed aircraft, such as an air-intercept (AI) jet, engaging a high speed threat. Not only can McCabe's results not be exploited, but if the Al aircraft is initially leading the target, inadvertently performing a sub-optimal lead-lead maneuver may put the aircraft in a vulnerable position. But executing the optimal lead-lag maneuver, i.e. turning away on the second leg, may cause the aircraft to fail to intercept the target. Thus, it is vitally important for tactical aircraft performing TMA to know where they will be relative to the emitter at the end of the data collection legs, both for self-protection and the potential for enhanced performance from data collection maneuvers. However, the tracker must obtain the emitter heading prior to executing the first turn in order to determine the target's relative position. In current TMA implementations, the observer cannot determine the target's relative position prior to executing the first turn based on the above-described observability constraint.

One way to avoid both the "require the track to best estimate the track" paradox and the TMA observer-maneuver vulnerability problem is using the technique described in the present inventor's patent disclosure entitled, "A Method for Passively Estimating an Emitter's Position and Velocity Using Bearings-Only Without Requiring Observer Acceleration," Ser. No. 10/419193, hereinafter referred to as "inventor's co-pending application" filed on even date herewith and incorporated by reference by its entirety into the instant specification. The method described in the aforementioned patent application avoids the observability constraint. That is, obtaining emitter range, speed and heading does not require the observer to fly a dogleg course, or otherwise accelerate. The described method obtains emitter range by estimating speed in two ways: (1) using platform and mission identification to estimate a discrete target speed; and (2) obtaining speed from bearing rates-of-change, but as a function of unknown range. Equating the functionality speed with the discrete speed determines emitter range.

The above-described approach performs well for many critical emitters. However, a large data base covering the performance of all platforms encountered is required in order to accurately estimate emitter speed. Usually, associating signal pulse parameters with target kinematics requires an artificial intelligence or expert system implementation. And even with an extensive data base and sophisticated logic, the track generated for a subset of emitters can be ambiguous because several discrete speeds are equally likely. This speed-ambiguity arises from a one-to-several radar-to-platform mapping, and also a one-to-several radar-mode to mission mapping. Breaking or reducing the ambiguities requires the use of elevation measurements.

For many installations, it is desirable to utilize aspects of the speed, heading and range estimation method disclosed in the inventor's co-pending application, but with only a simple generic platform database and simple logic. It is also desirable to not require an elevation array in order to break ambiguities. But, the simple data base and logic mean there will be many more speed ambiguities, and, even for one discrete speed, significant uncertainty about its correct value. Thus, while a complex implementation can achieve accuracies for many emitters of 5%, a simple implementation has errors typically at least three times greater than the complex implementation.

Thus, a need exists for a method which removes the vulnerability of a tactical aircraft associated with the observability maneuver, and makes the use of TMA for tactical aircraft practical. Another need is for a method using bearings-only TMA, without elevation measurements to resolve speed ambiguities and identify an emitter.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

SUMMARY AND OBJECTS OF THE PRESENT INVENTION

Figure 1B:
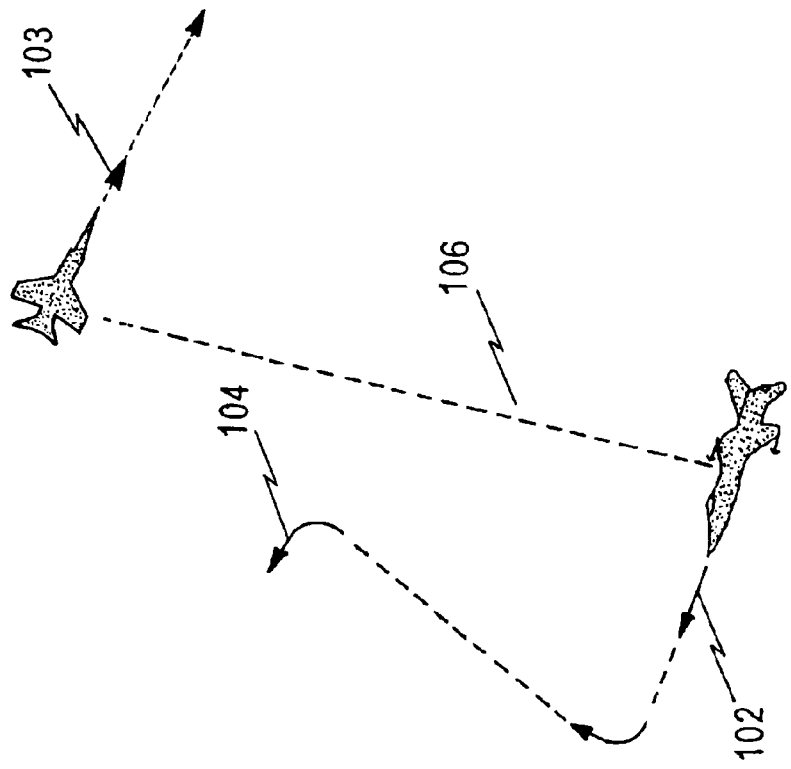
FIG. 1b depicts a prior art lag-lead maneuver.
Figure 1A:
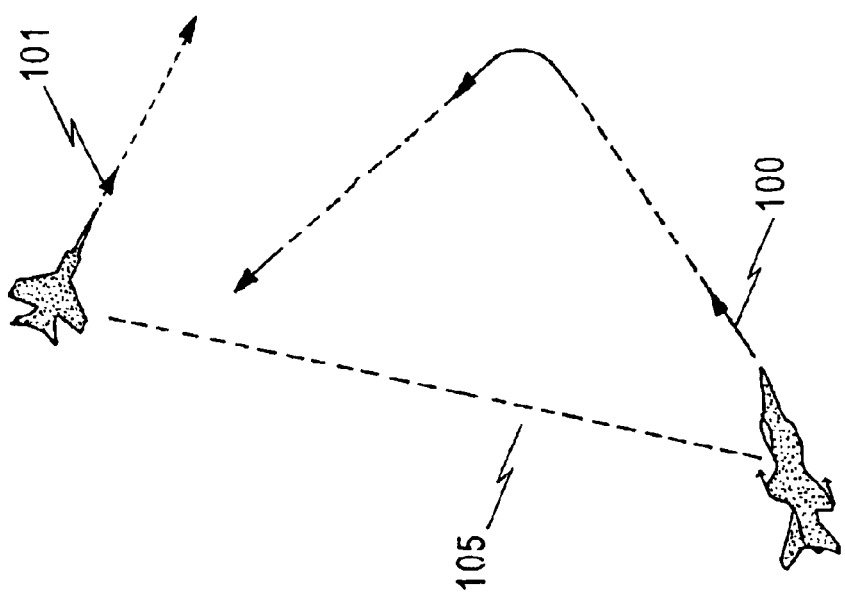
FIG. 1a graphically depicts a prior art lead-lag observer maneuver.

It is thus an object of the present invention to combine TMA, which requires multiple data collection legs, and the single-leg track estimation approach described in inventor's co-pending application, in a manner overcoming the deficiencies in both and improving the performance of each.

The present invention utilizes TMA to resolve single-leg track speed estimate ambiguities, and particularly those arising from simplified implementations of inventor's co-pending application. Thus, the invention also improves the radar-platform-mission identification over that intrinsically obtainable in suboptimal implementations of inventor's co-pending application. In a sense, the invention deduces the mission from speed, rather than deducing speed from the mission, as performed in inventor's copending application.

The present invention requires the observer accelerations, typically heading changes, of conventional bearings-only passive ranging. The present invention eliminates the current shortcomings in the TMA maneuver because before maneuvering the observer knows the possible approximate speeds and headings of the target. Therefore, the present invention minimizes the vulnerability of the observer when executing the necessary TMA accelerations, and further allows the observer to exploit the optimal heading change results of McCabe.

It is another object of the present invention to provide a method which removes the vulnerability of a tactical aircraft associated with the observability maneuver, and makes possible the use of TMA for tactical aircraft.

Thus, it is another object of the present invention to enhance TMA estimator performance, and in particular lag-lead performance, by insuring the correct initialization of the estimator's state and error covariance, by at least one of the track estimates made using the method of the inventor's co-pending application, because inventor's co-pending application provides a mechanism for generating the most accurate a priori information available.

Still another object of the present invention is to reduce the amount of data collection required to obtain accurate track and the number of maneuvers that should be performed.

The present invention assures rapid convergence not only because the optimal maneuver is utilized, but also because the estimator a priori error statistics accurately match the initial state estimate provided by the filter algorithm. T. Nishimura, in "On the A Priori Information in Sequential Estimation," *IEEE Transaction on Automatic Control*, vol. AC-11, pp. 197–204, April 1966, has shown this is essential for optimal filter performance in the sense of most rapid convergence to an estimate having the smallest possible error. The difference in lead-lag and lag-lead performance for conventional TMA estimators is that lead-lag more quickly damps out a priori error.

Because the invention provides TMA the most rapid possible convergence to the emitter track both by optimal maneuver, and optimal estimator initialization, an accurate range estimate can be obtained at the very start of the second data collection leg. Thus, the invention reduces the overall amount of data collection required to obtain an accurate track, and the number of maneuvers that must be performed.

The present invention allows the use of a simplified implementation of the method of inventor's co-pending application. It uses bearings-only TMA, rather than elevation measurements, to resolve the speed ambiguities, and so does not require an elevation array.

The present invention also provides a means to utilize McCabe's results in optimizing TMA performance. Track estimates generated by the method of inventor's copending application initialize the bearings-only TMA estimator. The initial track estimates predict the relative observer-emitter positions after the data collection legs, eliminating the vulnerability due to uncertainty in observer-emitter geometry during the required maneuver. The initial track estimates also enhance the estimator convergence performance for lag-lead maneuvers so that performance rivals that of lead-lag.

Thus, by not only removing the potential vulnerability of the observability maneuver but also enhancing the performance of the lag-lead intercept, the invention makes the use of TMA for tactical aircraft much more practical and robust.

In accordance with the above objects and features, a method aspect according to an embodiment of the present invention describes a method of estimating target range and heading based on bearing measurements. One or more target characteristics are measured and a set of parameters characterizing a set of potential target signal sources is generated based thereon. Based on the set of potential target characterization parameters and a target data base, a most probable set of targets is identified and the mode of operation of the target and the corresponding target set are associated with a set of target kinematic regimes. A performance data base is used to: (1) derive from the set of target kinematic regimes a specific speed or discrete set of speeds best adapted to a set of all possible target missions, (2) generate from the target characteristic measurements one or more target bearings, (3) estimate from the one or more target bearings the target speed as a continuous function of target range, and (4) determine the target range consistent therewith by comparing the continuous target speed with the specific speed or the discrete set of speeds derived from the performance data base.

DESCRIPTION OF PREFERRED EMBODIMENTS

Figure 2:
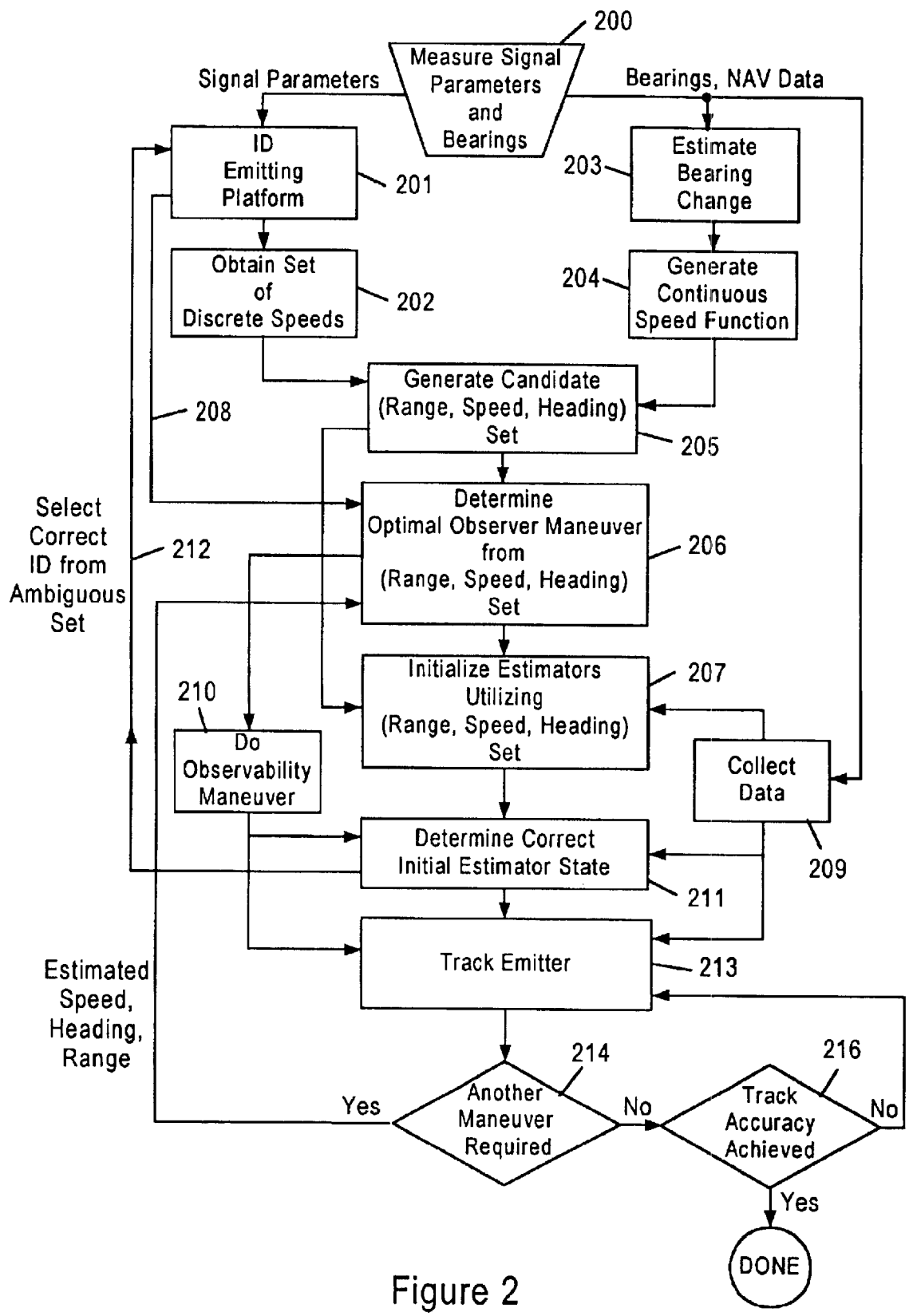
FIG. 2 is a top level flow chart depicting the steps of performing the method according to an embodiment of the invention.

A logic flow chart of an embodiment of the present invention is depicted in FIG. 2. Process steps 200 through 205 occur prior to the observability maneuver in step 210.

Steps 200–205 are similar to the steps described in the inventor's copending application with a key difference. Unlike the aforementioned disclosure, the signal parameters extracted in step 200 are not required to uniquely or nearly uniquely identify the platform type in step 201. Hence, a large set of speeds may be obtained in step 202. Typically, the set may contain over twenty discrete speeds. Process steps 203 and 204 estimate speed as a function of unknown range and heading. These steps may be implemented as described in the aforementioned disclosure. Comparing this single continuous speed with each discrete speed from step 201 generates (step 205) a set of range and velocities consistent with each discrete speed.

As part of the ID emitting platform process (Step 201), an error for the discrete speed estimate is determined. The discrete speed estimate error is obtained from the performance data used to produce the speed estimate. Using the discrete speed estimate error, step 205 determines the variance in the range, speed and heading estimates, and the estimate cross correlations. The variance and cross correlation estimates form the elements of an a priori error covariance matrix used to initialize the TMA track estimator in step 207. The range, speed, and heading estimates are also used to generate an initial state set in the process at step 207.

Determining the best maneuver at step 206 is complicated by the fact that step 202 generally produces multiple speed estimates; however, the emitter headings generated from the speeds in step 205 cluster into a small number of sets relative to the optimum lead lag maneuver. In most cases, there will be only two sets and they will have the following important property: the lead-lag maneuver for one set results in a lag-lead maneuver for the other. Thus, even if the optimal maneuver is not correctly flown, the emitter track will be generated using the second best maneuver. The most common reason for not flying the lead-lag against the emitter is the misassignment of speed probability in step 202; however, self-defense is another key reason. Emitter identification in step 201 may provide signals at step 208 representing the ID of a threat that contravenes the most likely cluster determined from steps 202 and 205. Thus, based on information 208 from the ID emitting platform step 201, the observer can choose to fly a track minimizing vulnerability or resulting in an intercept rather than optimizing data collection.

Because there are a set of initial conditions, rather than just one initial condition as in conventional TMA, tracking filter initialization (step 207) requires establishing a track estimator for each initial state and initial a priori error variance estimate. The observability maneuver (step 210) is performed after step 206. After the observability maneuver (step 210) is performed, the correctly initialized filter is determined (step 211) using the estimators from step 207 and the observability maneuver 210. This determination exploits the performance characteristics described by the Nishimura reference. The actual mechanism used depends on the specific estimator implementation, but is generally based on the innovations or residual whitening property of optimal estimators, as described by Kailath, "An Innovations Approach to Least Squares Estimation-Part I: Linear Filtering in Additive White Noise," *IEEE Trans. on Automatic Control*, Vol. AC-13, No.6, December 1968.

In parallel with track determination, bearing data collection continues and is stored in step 209. After step 210, the optimum maneuver is performed, and the correct filter is determined at step 211. The correct initial estimator state determination is fed back (step 212) to the platform identification process 201, and the unique, correct platform is determined. Initial estimator state determination (step 211) typically uses all available bearing data from step 209 from the start of data collection to the current time. There may be data buffer size limitations preventing the storage of all data from the initial detection to current time. Emitter tracking at step 213 continues as bearing measurements are made. Using the estimator properties elucidated by the Kailath reference, step 214 determines whether another maneuver is required. Another maneuver may be required if step 205 failed to produce an a priori state consistent with the initial error variance estimate, or the maneuver requirement generated in step 206 did not result in a lead-lag maneuver. A determination of no further maneuver required, causes the process flow to continue to perform track estimation at step 216 until the required track fidelity is met.

The preceding description of the present invention shows there are two steps which require further discussion: step 206, Determine Optimal Observer Maneuver; and step 211, Determine Correct Initialization.

Figure 3A:
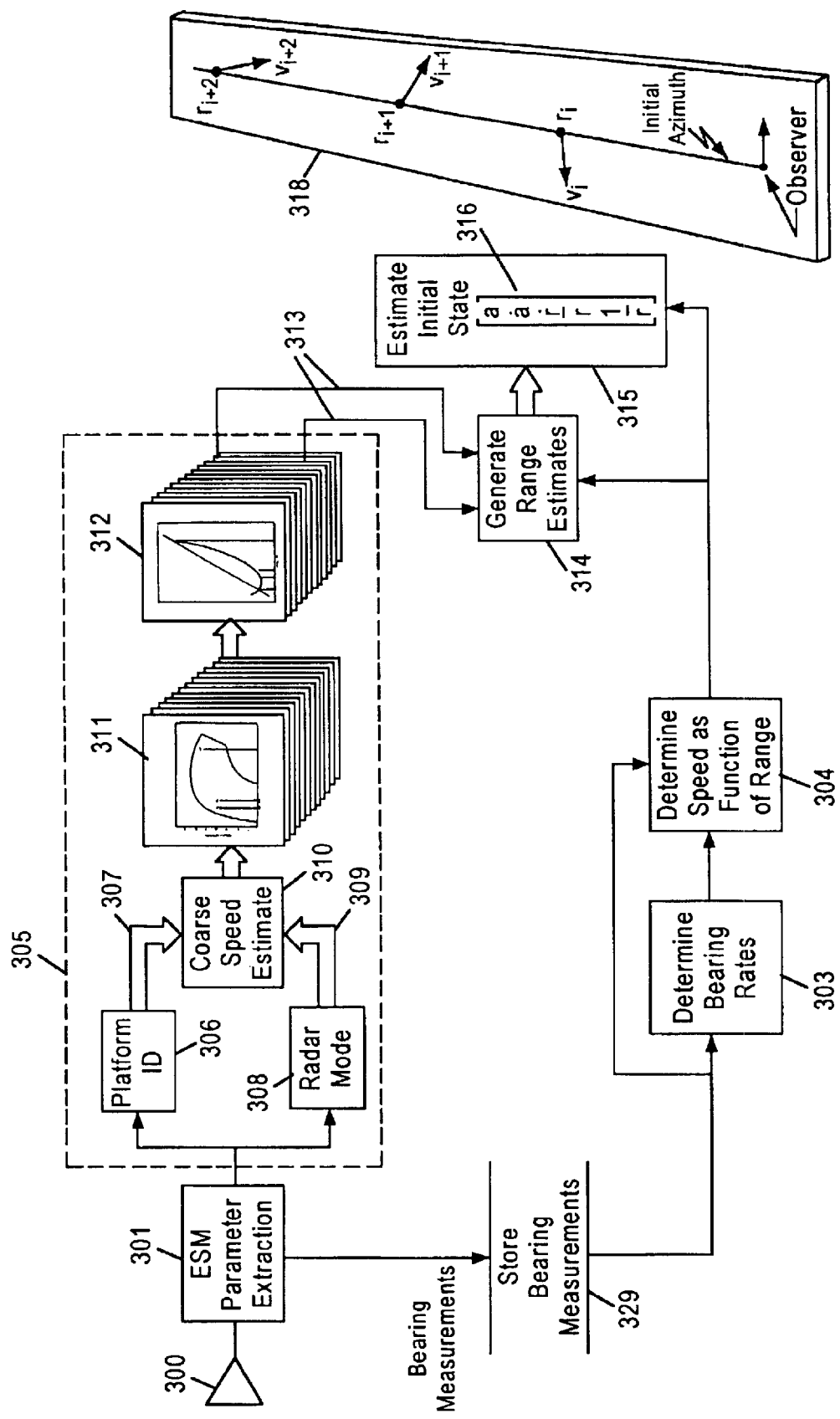
FIG. 3a is a detailed block diagram of a preferred implementation of the observer maneuver determination and TMA estimator initialization aspect of the present invention.
Figure 3B:
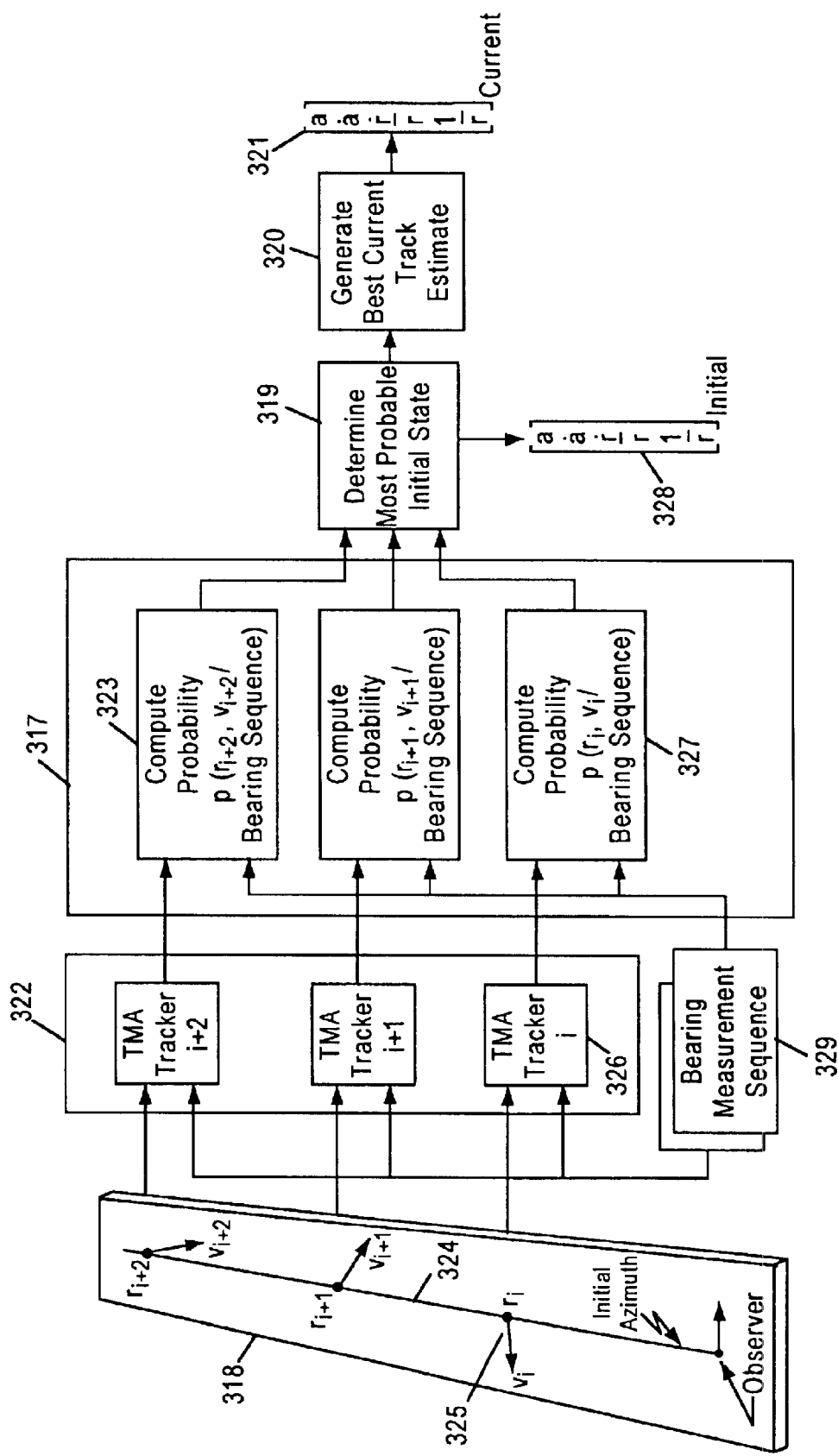
FIG. 3b is a detailed block diagram of a preferred implementation of the TMA track estimation aspect of the present invention.

FIGS. 3a and 3b are block diagrams of a portion of an embodiment of the present invention. FIG. 3a depicts the detailed implementation of steps 200 through 207, while FIG. 3b depicts a preferred implementation of the TMA track portion of the invention (steps 208 through 216). Because both the derived range, speed and heading estimates in step 205 (FIG. 2) and track estimate performed in steps 211 and 213 require accurate bearing rates of change, the preferred sensor 300 (FIG. 3a) is a short-baseline/long-baseline interferometer (SBI/LBI) as described in Kaplan, U.S. Pat. No. 4,734,702, "Passive Ranging Method and Apparatus." The long baseline interferometer provides excellent bearing resolution, and supports very accurate bearing rate-of-change measurements.

Step 301 involves conventional Electronic Surveillance Measures (ESM) parameter extraction. The SBI phase measurement ambiguities are resolved, and bearing estimates derived from the extracted ESM parameters and used to resolve the LBI utilizing the method described by Kaplan. The combined SBI/LBI bearing estimates stored at step 329 (FIG. 3b) are input to step 303 to estimate the first and second derivatives with respect to time. The continuous speed function is generated from the relative heading vector in step 304, as described in the co-pending application.

Step 305 is a subset of the process used to generate the discrete speed in the copending application. In particular, the platform identification determined at step 306 is not unique, as indicated by the multiple outputs (reference numeral 307), and the radar mode step 308, rather than radar model, is identified. Therefore, unlike the implementation in the copending application, radar identification is typically not available for platform identification, and even the mode ID may not be unique, as indicated by the multiple outputs (reference numeral 309) from step 308. Also, a flight envelope data base 311 and a power curve data base 312 are generic, and not specific to a particular aircraft. Thus, steps 311 and 312 refine the coarse speed estimates from step 310, but the result 313 is a set of discrete speeds. Note that set 313 can be larger than the set initially generated in step 310. The discrete speeds are compared with the continuous speed function in step 314, and a set of range, speed, and heading triads output to the initial state generator 315.

The initial state generator 315 transforms the range, speed, and heading triads, bearing measurements, and rate calculations to the particular state used by the estimator. The preferred state elements are modified polar coordinates 316. The modified polar coordinates are bearing or azimuth a, azimuth rate ȧ, range rate divided by range ṙ/r, and inverse range 1/r. The modified polar state elements are desirable to use because, except for the last inverse range state element, all elements in the state vector are observable before the first maneuver. If elevation measurements are available, elevation and elevation rate may be added to this state vector.

A preferred embodiment of the present invention is implemented such that elevation measurements are not required. At the longer distances of interest when performing passive TMA, aircraft are predominantly found in a ±5° elevation wedge relative to the level plane at the observer. Also, changes in relative altitude do not generate significant changes in elevation, except for close-in emitters and therefore the present invention does not benefit significantly from elevation measurements, in direct distinction to the invention of the copending application, where elevation measurements may play a crucial role.

The a priori error variance associated with the initial state vector 316 is determined by the uncertainty in the range, speed, and heading triad estimate and in the bearing measurements, and the particular transformations used to generate the state vector 316. The uncertainty in the bearing measurement is a function of the signal-to-noise ratio and system calibration errors and is straightforward to determine. Errors in the triad estimate are predicated on the correct data base elements 311 and 312 being used to generate the discrete speed seed. For incorrect speeds, the error estimate can be proportionately wrong. Determined by the set of speed estimates 313, the set of initial states is shown schematically as candidate ranges and velocities 318. Only one of the range-velocity pairs shown generates the correct initial state in the set of state vectors 316 generated in step 315. The error variance is computed for each state vector 316 assuming the speed associated with that state is correct.

As is readily understood from the Nishimura reference, the potentially huge discrepancy between initial state and initial error variance estimate is disadvantageous for conventional TMA implementations. However, in the present invention the discrepancy is actually a benefit because the incorrect state is more easily detectable in the state hypothesis test 317, FIG. 3b. The state hypothesis test 317, and a most probable initial state determination step 319, implement step 211, FIG. 2, Determine Correct Initial State. The implementation is performed by computing likelihood weights (step 323) according to the method described by Magill, "Optimal Adaptive Estimation of Sampled Stochastic Processes," *IEEE Trans. Automatic Control*, AC-10, vol.4, 1965. Each likelihood weight is based on an initial range and velocity represented conceptually by candidate ranges and velocities 318 FIG. 3b as, for example a range and velocity pair 325, range $r_i$ and velocity $v_i$, i.e. speed and heading along an initial line of bearing 324. The initial values each determine a separate tracking filter in set 322. For example, $(r_i, v_i)$ 325 is associated with a TMA tracker i 326.

In the probability weight computation step 323, the consistency, of the bearing predictions based on the estimator state, or equivalently the estimated range and velocity, is compared with the measured bearing utilizing a Bayes rule calculation (see, for example, *Bayesian Inference and Maximum Entropy Methods in Science and Engineering*: 20th International Workshop, Ali Mohammad-Djafari (Editor), American Institute of Physics, July 2001).

The Bayes rule calculation uses the error variance associated with the TMA tracker 322. Ultimately, this error variance is associated with the initial error. Hence for probability weight 327, which uses state and error variance estimates from tracker 1326, the probability weight 327 has an assigned likelihood of the initialization 325.

Thus, the resulting likelihood functions in effect assign probabilities to the range-velocity pairs shown in range and velocity candidates 318 FIG. 3a and FIG. 3b. Each of the range-velocity pairs is assumed equally probable initially. The likelihoods are revised over time, as bearing measurements 329 are processed by each estimator. After several iterations, and after the observability maneuver (step 210 of FIG. 2), the initialization range-velocity pairs located proximate the correct state value generate a subset of Bayes weights, or likelihoods, approaching 1. The Bayes weights are utilized in step 319 to determine the correct estimator initialization. Step 319 determines the number of bearing measurements required to generate the requisite confidence that the weight values correctly reflect the relative fidelity of the initial state estimates 316. The initial range-velocity state 325 found in process 319 is used to determine which TMA estimator of the TMA estimator set 322 correctly matches the emitter track. The single tracking filter of set 322 associated with the correct initialization is typically used for future calculations. The bank of tracking filters could be used and the single estimate from the Baysian weighted sum of the outputs generated; however, this approach is cumbersome once the correct initialize set is known. Thus, after sufficient bearing measurement iterations have generated the most probable Bayesian weight (as determined by comparing the Baysian weight to a predetermined threshold value), the single tracking filter is used in step 213, FIG. 2. However, an alternative approach would use the Bayesian weighted estimate of all the tracking filter state outputs. The weighted sum, or alternately the single filter iteration, is performed in a generate best current track estimate step 320. Step 320 calculation determines a current state estimate 321 developed from the initial track estimate 328 using the bearing measurement sequence 329. The Bayesian weights 317 are also provided to the platform ID step 201 (FIG. 2). Generally, one weight is significantly closer to 1 than the others, so uniquely determining the correct platform is straightforward.

An embodiment of the present invention in the form shown in FIG. 3a and FIG. 3b was implemented in a simulation. The target was a 10 GHz emitter at 100 nmi initially with a speed of 600 knots, heading 45° and altitude of 28,000 feet. The observer was flying at 480 knots due north at 31,000 feet. The LBI baseline was 200 inches, and signal SNR, after pulse averaging, was 25 dB. The sample rate was 1 Hz. The number of range-velocity pairs 325 (FIG. 3b) generated was 11, but the clustering in process 314 resulted in only three initial state vectors 316 required.

Figure 4A:
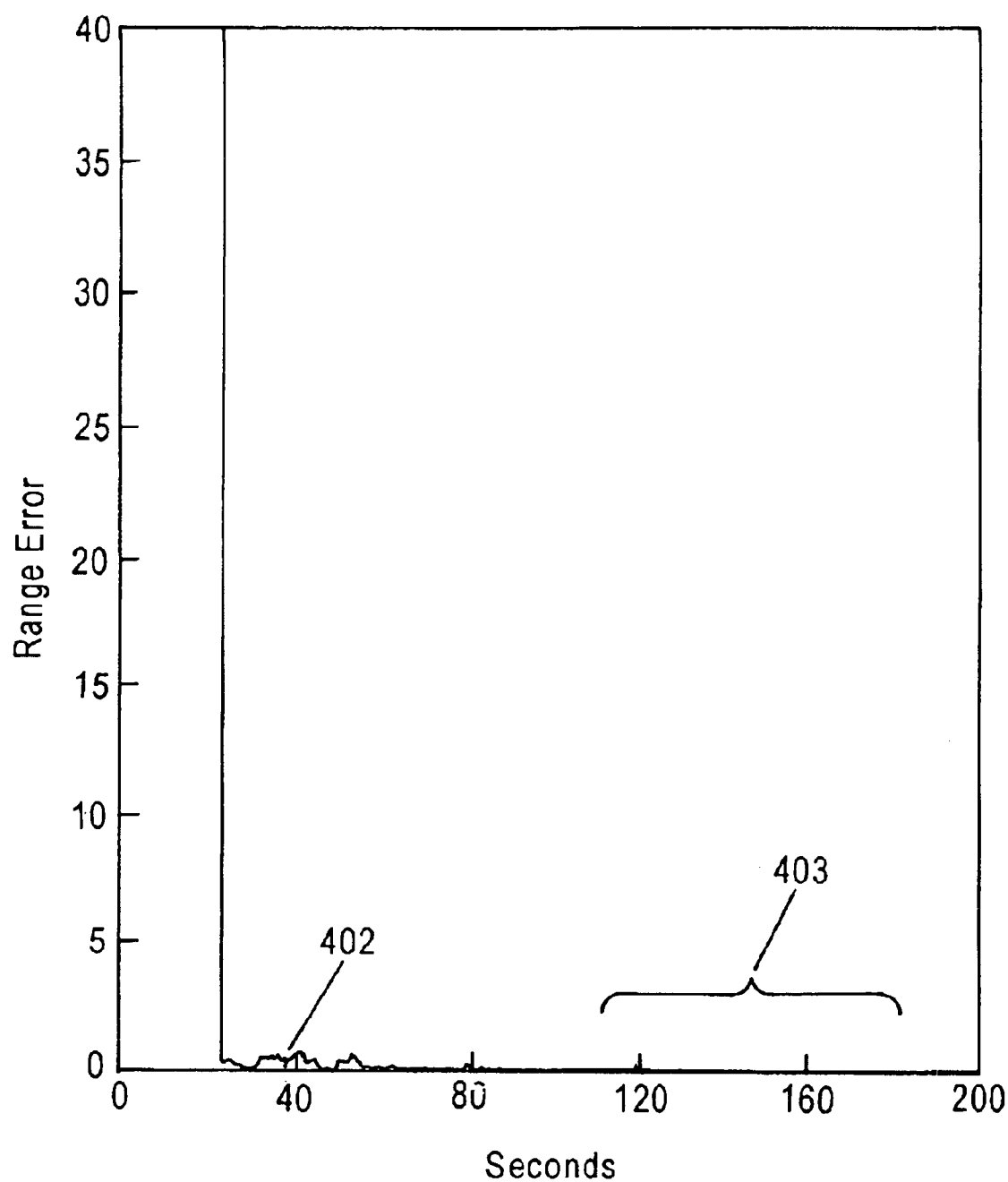
FIG. 4a is a graph depicting the performance of an embodiment of the present invention using a lead-lag maneuver.

FIG. 4a is a graph depicting the range error versus time performance for the observer performing a lead-lag maneuver with a 30° heading change between constant velocity data collection legs. The first leg was 6 seconds, followed by a standard rate 3° per second turn. The correctly initialized TMA estimator converged (402, FIG. 4a) after four bearing updates following the heading change. The filter was selected in 319 FIG. 3b, by a threshold test. The threshold was set at 0.9, and a correct likelihood value of 0.98.

Figure 4B:
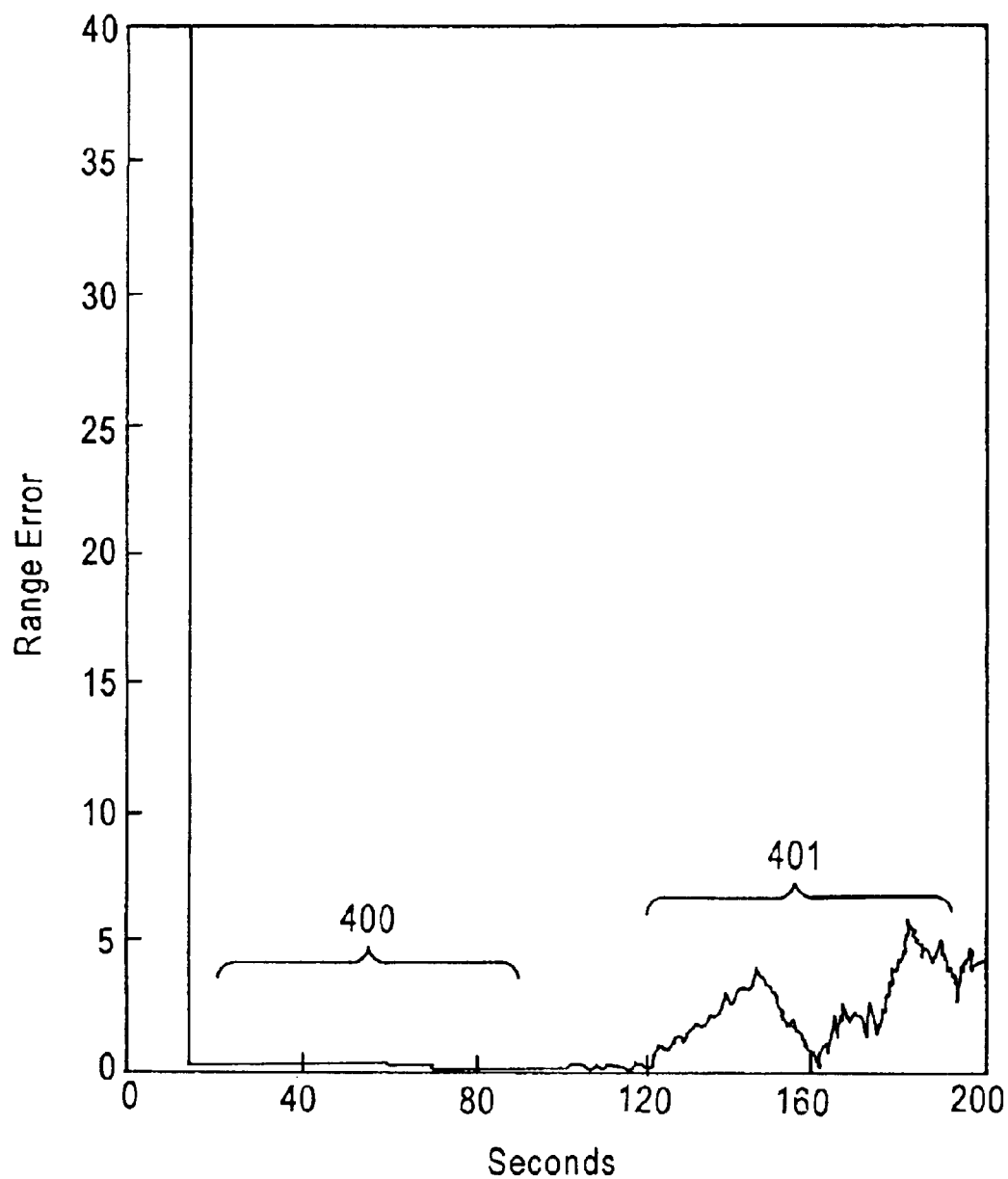
FIG. 4b is a graph depicting the performance for a lag-lead maneuver in the FIG. 4a scenario, and graphically depicts the enhancement of lag-lead performance over that of conventional TMA so the initial convergence is comparable to lead-lag.

FIG. 4b is a graph depicting the range error versus time performance for the same scenario, but for the observer performing a lag-lead maneuver. Unlike conventional TMA implementations, the hypothesis test implemented here resulted in TMA convergence even faster than for lead-lag. Convergence (400 FIG. 4b) actually occurred during the standard rate turn. This demonstrates that one of the main objects of the invention, to render lag-lead maneuver as effective as lead-lag maneuver by utilizing the initialization set 318 and hypothesis test 317, was met.

However, it is important to note that lead-lag estimates of speed and heading are generally better than lag-lead. The target heading had random heading fluctuations with a correlation time of approximately 5 seconds, and standard deviation of about 3 degrees. The lead-lag long time straight leg performance 403 (FIG. 4a) indicates the tracking filter was able to continually refine the heading and speed estimate. However, the lag-lead estimates grew in error 401 (FIG. 4b) because of the inability to refine target velocity. This indicates additional observer maneuvers may be required for lag-lead when undertaking long term surveillance, but not in short-time tactical situations. It is precisely in such short-time tactical situations, involving emitter interception, that lag-lead maneuvers are most useful.

It will be readily seen by one of ordinary skill in the art that the present invention fulfills all of the objects set forth above. After reading the foregoing specification, one of ordinary skill be able to affect various changes, substitutions of equivalents and various other aspect of the invention as broadly disclosed herein. It is therefore intended that the protection granted hereon be limited only by the definition contained in the appended claims and equivalents thereof.

What is claimed is:

1. A method of estimating target range and heading from bearing measurements enhancing bearings-only estimator convergence to a target track, and permitting optimization of an observer position relative to the target at the end of the total bearing measurement period, by using one or more estimates of the target range, speed and heading, made from bearing measurements before an observer maneuver, to determine the most appropriate observer maneuver giving complete bearings-only target-motion-analysis observability, comprising the steps of:

measuring an emitter signal frequency, time and phase characteristics, wherein the emitter is on the target;

generating from the emitter signal frequency, time, and phase characteristic measurements a set of parameters characterizing a set of potential emitter signal sources;

identifying, from the set of potential emitter characterization and an emitter-platform association data base, a most probable set of platforms the emitter is on and associating the mode of operation of the emitter and the corresponding platform set with a set of emitter kinematic regimes, and utilizing a performance data base, deriving from the set of emitter kinematic regimes a specific speed or discrete set of speeds best adapted to a set of all possible platform missions, generating from the measured emitter signal frequency, time, and phase characteristics one or more emitter bearings, estimating from the one or more emitter bearings the emitter speed as a continuous function of emitter range, and determining the emitter range consistent therewith by comparing the continuous emitter speed with the specific speed or the discrete set of speeds derived from the performance data base; and assigning an accuracy figure of merit to the range estimate, speed estimate and heading estimate, wherein the accuracy figure of merit is determined from the predicted variance in the particular discrete speed estimate and the continuous speed function.

2. The method of claim 1 wherein, subsequent to the observer performing the maneuver, the a priori state identification is not unique, and further comprising the steps of:

computing a likelihood value for each estimate indicative of the probability of the current track estimate being correct relative to other current track estimates in the set, wherein the likelihood is determined based on the a priori covariance, the current error covariance, and a comparison of predicted bearings with measured bearings;

operating on subsequent bearing measurements with each estimator assigned a likelihood value; and recomputing the likelihood value after the estimators process each new bearing measurement.

3. The method of claim 2, wherein the track estimate having the largest likelihood value is the unique emitter track estimate.

4. The method of claim 2, wherein the track estimate is a weighted average of all estimates at the current measurement time, the weights based on the computed likelihood values.

5. The method of claim 1, further comprising the steps of:

utilizing the accuracy figure of merit to determine an a priori estimator error variance corresponding to the range, speed and heading estimates used to determine the a priori state elements of the estimator, wherein each of the error variance and state pairs are used to initialize an estimator;

utilizing the set of accuracy figure of merits and corresponding range, speed and heading estimates, to determine the best maneuver to undertake to satisfy the estimator observability requirement and the observer tactical needs;

identifying the correct a priori estimate set based on bearing measurements made after the observer performs the maneuver;

determining the correct estimator based on the a priori estimate identification;

utilizing the estimator operating based on bearing measurements made before and after the maneuver to refine the emitter track;

utilizing the emitter track estimate to predict a bearing to the emitter at the bearing measurement time;

comparing the predicted and measured bearings;

determining the need for subsequent maneuvers based on the comparison; and determining the need for the estimator operating based on further bearing measurements based on the comparison.

6. The method of claim 1, wherein the track estimate having the largest likelihood value is the unique emitter track estimate.

7. The method of claim 1, wherein the track estimate is a weighted average of all estimates at the current measurement time, the weights based on the computed likelihood values.

8. The method of claim 1, wherein the observer maneuver set includes constant velocity data collection legs with turns between the data collection legs, wherein the observer heading is adjusted so the observer velocity is on the same side of the bearing to the emitter as one of the predicted velocities of the emitter for one data collection leg, and on the opposite side for the following data collection leg.

9. The method of claim 1, wherein the observer maneuver set includes constant velocity data collection legs with turns between the data collection legs, wherein the observer heading is adjusted so the observer velocity is on the opposite side of the bearing to the emitter as the chosen predicted velocity of the emitter for one data collection leg, and on the same side for the following data collection leg.

10. A method of uniquely identifying an emitter platform and mission utilizing an observer maneuver, comprising:

measuring an emitter signal frequency, time and phase characteristics, wherein the emitter is on the target;

generating from the emitter signal frequency, time, and phase characteristic measurements a set of parameters characterizing a set of potential emitter signal sources;

identifying, from the set of potential emitter characterization and an emitter-platform association data base, a most probable set of platforms the emitter is on and associating the mode of operation of the emitter and the corresponding platform set with a set of emitter kinematic regimes, and utilizing a performance data base, deriving from the set of emitter kinematic regimes a specific speed or discrete set of speeds best adapted to a set of all possible platform missions, generating from the measured emitter signal frequency, time, and phase characteristics one or more emitter bearings, estimating from the one or more emitter bearings the emitter speed as a continuous function of emitter range, and determining the emitter ranges consistent therewith by comparing the continuous emitter speed with the specific speed or the discrete set of speeds derived from the performance data base; and identifying the emitter platform and mission as the mode, platform, and mission set associated with the correct a priori ranges, speeds and heading.

11. The method of claim 10, wherein the identifying the emitter platform and mission further identifies one of the radar and radar mode.

12. A method for assigning likelihood values, or relative probabilities to the identity of an emitter platform and the emitter mission utilizing an observer maneuver, comprising:

measuring an emitter signal frequency, time and phase characteristics, wherein the emitter is on the target;

generating from the emitter signal frequency, time, and phase characteristic measurements a set of parameters characterizing a set of potential emitter signal sources;

identifying, from the set of potential emitter characterization and an emitter-platform association data base, a most probable set of platforms the emitter is on and associating the mode of operation of the emitter and the corresponding platform set with a set of emitter kinematic regimes, and utilizing a performance data base, deriving from the set of emitter kinematic regimes a specific speed or discrete set of speeds best adapted to a set of all possible platform missions, generating from the measured emitter signal frequency, time, and phase characteristics one or more emitter bearings, estimating from the one or more emitter bearings the emitter speed as a continuous function of emitter range, and determining the emitter range consistent therewith by comparing the continuous emitter speed with the specific speed or the discrete set of speeds derived from the performance data base; and assigning an accuracy figure of merit to the range estimate, speed estimate and heading estimate, wherein the accuracy figure of merit is determined from the predicted variance in the particular discrete speed estimate and the continuous speed function utilizing the accuracy figure of merit to determine an a priori estimator error variance corresponding to the range, speed and heading estimates used to determine the a priori state elements of the estimator, wherein each of the error variance and state pairs are used to initialize an estimator;

utilizing the set of accuracy figure of merits and corresponding range, speed and heading estimates, to determine the best maneuver to undertake to satisfy the estimator observability requirement and the observer tactical needs;

identifying the correct a priori estimate set based on bearing measurements made after the observer performs the maneuver;

determining the correct estimator based on the a priori estimate identification;

utilizing the estimator operating based on bearing measurements made before and after the maneuver to refine the emitter track;

utilizing the emitter track estimate to predict a bearing to the emitter at the bearing measurement time;

comparing the predicted and measured bearings;

determining the need for subsequent maneuvers based on the comparison; and determining the need for the estimator operating based on further bearing measurements based on the comparison, wherein the mode, platform, and mission set associated with an priori range is assigned the likelihood value of the associated target motion analysis.

13. A method of estimating emitter range and heading from bearing measurements enhancing bearings-only estimator convergence to an emitter track, and permitting optimization of an observer position relative to the emitter at the end of the total bearing measurement period, by using one or more estimates of the emitter range, speed and heading, made from bearing measurements before an observer maneuver, to determine a most appropriate observer maneuver giving complete bearings-only target-motion-analysis observability, comprising the steps of:

measuring one or more emitter characteristics;

generating based on the emitter characteristic measurements a set of parameters characterizing a set of potential emitter signal sources;

identifying, based on the set of potential emitter characterization parameters and an emitter data base, a most probable set of emitter and associating the mode of operation of the emitter and the corresponding emitter set with a set of emitter kinematic regimes, and utilizing a performance data base, deriving from the set of emitter kinematic regimes a specific speed or discrete set of speeds best adapted to a set of all possible emitter missions, generating from the emitter characteristic measurements one or more emitter bearings, estimating from the one or more emitter bearings the emitter speed as a continuous function of emitter range, and determining the emitter range consistent therewith by comparing the continuous emitter speed with the specific speed or the discrete set of speeds derived from the performance data base.

14. The method of claim 13, further comprising the step of:

assigning an accuracy figure of merit to the range estimate, speed estimate and heading estimate, wherein the accuracy figure of merit is determined from the predicted variance in the particular discrete speed estimate and the continuous speed function.

15. The method of claim 13, wherein the emitter characteristics include emitter frequency, time, and phase.

16. A computer-readable medium comprising:

a data structure for an emitter data base;

a data structure for a performance data base;

at least one sequence of machine executable instructions in machine form, wherein execution of the instructions by a processor cause the processor to:

generate, based on emitter characteristic measurements, a set of parameters characterizing a set of potential emitter signal sources;

identify, based on the set of potential emitter characterization parameters and the emitter data base, a most probable set of emitters and associating the mode of operation of the emitter and the corresponding emitter set with a set of emitter kinematic regimes, and utilize a performance data base to: (1) derive from the set of emitter kinematic regimes a specific speed or discrete set of speeds best adapted to a set of all possible emitter missions, (2) generate from the emitter characteristic measurements one or more emitter bearings, (3) estimate from the one or more emitter bearings the emitter speed as a continuous function of emitter range, and (4) determine the emitter range consistent therewith by comparing the continuous emitter speed with the specific speed or the discrete set of speeds derived from the performance data base.

17. The medium as claimed in claim 16, further comprising instructions which, when executed by the processor, cause the processor to:

assign an accuracy figure of merit to the range estimate, speed estimate and heading estimate, wherein the accuracy figure-r of merit is determined from the predicted variance in the particular discrete speed estimate and the continuous speed function.

18. The medium as claimed in claim 16, wherein the emitter characteristic measurements include frequency, time, and phase.

* * * * *